(12) United States Patent  (10) Patent No.: US 8,373,745 B2
Masuda et al. (45) Date of Patent: Feb. 12, 2013

(54) IMAGE PROCESSING APPARATUS, IMAGE DISPLAY APPARATUS, IMAGE APPARATUS, AND IMAGE PROCESSING METHOD

(75) Inventors: Tomonori Masuda, Miyagi (JP); Mikio Watanabe, Miyagi (JP); Eiji Ishiyama, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 860 days.

(21) Appl. No.: 12/414,181

(22) Filed: Mar. 30, 2009

(65) Prior Publication Data

US 2009/0244262 A1    Oct. 1, 2009

(30) Foreign Application Priority Data

Mar. 31, 2008 (JP) ................................ 2008-089704

(51) Int. Cl.
*H04N 13/02* (2006.01)
(52) U.S. Cl. .............................. 348/46; 348/51; 382/154
(58) Field of Classification Search .................... 348/51, 348/46; 382/154; 358/471; 345/426
See application file for complete search history.

(56) References Cited

U.S. PATENT DOCUMENTS

| 7,983,477 | B2* | 7/2011 | Holliman | 382/154 |
|---|---|---|---|---|
| 2005/0134939 | A1* | 6/2005 | Ikeda et al. | 358/471 |
| 2006/0066718 | A1* | 3/2006 | Yanagawa et al. | 348/51 |
| 2007/0003134 | A1* | 1/2007 | Song et al. | 382/154 |
| 2007/0165027 | A1* | 7/2007 | Nakadaira et al. | 345/426 |
| 2010/0086199 | A1* | 4/2010 | Kim et al. | 382/154 |

FOREIGN PATENT DOCUMENTS

JP     2006-229725 A    8/2006

OTHER PUBLICATIONS

Office Action dated Nov. 1, 2011 for Japanese Application No. 2008-089704 with partial Engish translation.

* cited by examiner

*Primary Examiner* — Jungwon Chang
(74) *Attorney, Agent, or Firm* — Birch, Stewart, Kolasch & Birch LLP

(57) ABSTRACT

An image processing apparatus inputs stereoscopic images, detects a depth of each of the inputted stereoscopic images, lays out the stereoscopic images at least in partial overlap in such a manner that the lager the depth is, the more forward the corresponding stereoscopic image is placed, and records the stereoscopic images having been laid out.

2 Claims, 16 Drawing Sheets

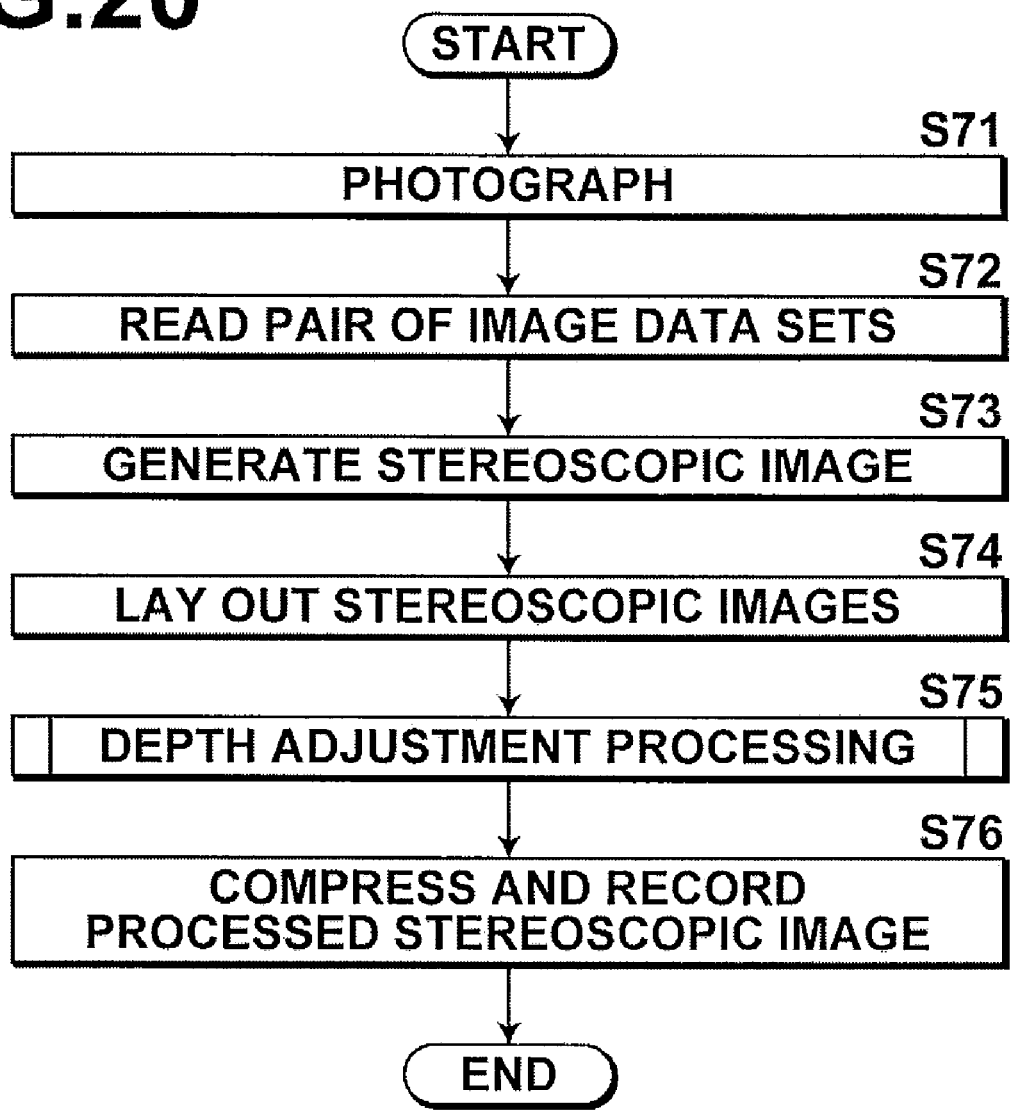

IMAGE PROCESSING APPARATUS, IMAGE DISPLAY APPARATUS, IMAGE APPARATUS, AND IMAGE PROCESSING METHOD

BACKGROUND OF THE INVENTION

1. Field of the Invention

The present invention relates to an image processing apparatus, an image display apparatus, an imaging apparatus, and an image processing method that process stereoscopic images enabling stereoscopic vision. More specifically, the present invention relates to layout of stereoscopic images.

2. Description of the Related Art

There have been proposed digital cameras enabling output of a plurality of planer images representing different scenes in photography in a layout desired by a user. One of such digital cameras outputs a composite planar image in which a plurality of planer images are laid out (U.S. Patent Application Publication No. 20050134939). A user selects a desired one of templates in various layouts recorded in advance in the digital camera, and images selected from a plurality of planer images are then inserted in the selected template. In this manner, a composite planar image is generated and output.

Meanwhile, methods of stereoscopic viewing have been known by displaying a plurality of images combined with use of parallax. A stereoscopic image realizing stereoscopic vision can be generated by obtaining a plurality of planar images through photography of the same subject from different viewpoints, and by combining the images with use of parallax of the subject included in the images.

At the time of generation of one stereoscopic image by laying out a plurality of stereoscopic images of different scenes, a parallax of a subject in planar images is used to view an image stereoscopically, as has been described above. Therefore, the depth of the stereoscopic image is dependent on the parallax. Consequently, an object located in background has a small parallax, since the object seems to be located at almost the same position when viewed by the left and right eyes. On the contrary, an object located in foreground seems to be located at positions different in right and left directions, and has a large parallax. For this reason, the depth of stereoscopic images varies, depending on scenes to be photographed.

However, if one planar image is generated by laying out a plurality of planar images of different scenes as has been described in U.S. Patent Application Publication No. 20050134939, the planar image does not represent the depth. Consequently, the method described in U.S. Patent Application Publication No. 20050134939 cannot be effectively used for a stereoscopic image arrangement.

SUMMARY OF THE INVENTION

The present invention has been conceived based on consideration of the above circumstances. An object of the present invention is therefore to provide an image processing apparatus, an image display apparatus, an imaging apparatus, and an image processing method that realize an effective arrangement of a plurality of stereoscopic images in one stereoscopic image.

A first image processing apparatus of the present invention comprises:

stereoscopic image input means for inputting a plurality of stereoscopic images;

depth detection means for detecting a depth of each of the stereoscopic images inputted by the stereoscopic image input means;

stereoscopic image arrangement means for laying out the stereoscopic images at least in partial overlap in such a manner that the larger the depth detected by the depth detection means is, the more forward the corresponding image is placed; and image recording means for recording the stereoscopic images laid out by the stereoscopic image arrangement means.

The "stereoscopic images" in this embodiment refer to images each enabling stereoscopic viewing generated by using a parallax of the same subject in a plurality of images obtained by photography from different viewpoints. The "depth" of each of the stereoscopic images refers to how the subject seems to be located due to the parallax, not an actual depth to the subject in a photographed space. The depth refers to a difference between a maximum parallax and a minimum parallax in each of the stereoscopic images.

A second image processing apparatus of the present invention comprises:

stereoscopic image input means for inputting a plurality of stereoscopic images;

stereoscopic image arrangement means for laying out the stereoscopic images inputted by the stereoscopic image input means at least in partial overlap in an arbitrary order;

depth adjustment means for adjusting a depth of each of the stereoscopic images to cause the depth to become larger as the corresponding stereoscopic image is placed more forward by the stereoscopic image arrangement means; and image recording means for recording the stereoscopic images laid out in a state where the depth has been adjusted by the depth adjustment means.

The arbitrary order may be an order desired by a user, an order determined randomly by the apparatus, or a preset order.

A first image display apparatus of the present invention comprises:

stereoscopic image input means for inputting a plurality of stereoscopic images;

depth detection means for detecting a depth of each of the stereoscopic images inputted by the stereoscopic image input means;

stereoscopic image arrangement means for laying out the stereoscopic images at least in partial overlap in such a manner that the larger the depth detected by the depth detection means is, the more forward the corresponding image is placed; and stereoscopic image display means for displaying the stereoscopic images laid out by the stereoscopic image arrangement means.

A second image display apparatus of the present invention comprises:

stereoscopic image input means for inputting a plurality of stereoscopic images;

stereoscopic image arrangement means for laying out the stereoscopic images inputted by the stereoscopic image input means at least in partial overlap in an arbitrary order;

depth adjustment means for adjusting a depth of each of the stereoscopic images to cause the depth to become larger as the corresponding stereoscopic image is placed more forward by the stereoscopic image arrangement means; and stereoscopic image display means for displaying the stereoscopic images laid out in a state where the depth has been adjusted by the depth adjustment means.

A first imaging apparatus of the present invention comprises:

imaging means for obtaining each pair of image data sets by photographing a subject from different viewpoints;

stereoscopic image generation means for generating each stereoscopic image by calculating a distance to each part of the subject based on the corresponding pair of image data sets obtained by the imaging means;

depth detection means for detecting a depth of each of the stereoscopic images generated by the stereoscopic image generation means;

stereoscopic image arrangement means for laying out the stereoscopic images at least in partial overlap in such a manner that the larger the depth detected by the depth detection means is, the more forward the corresponding image is placed; and image recording means for recording the stereoscopic images laid out by the stereoscopic image arrangement means.

A second imaging apparatus of the present invention comprises:

imaging means for obtaining each pair of image data sets by photographing a subject from different viewpoints;

stereoscopic image generation means for generating each stereoscopic image by calculating a distance to each part of the subject based on the corresponding pair of image data sets obtained by the imaging means;

stereoscopic image arrangement means for laying out the stereoscopic images generated by the stereoscopic image generation means at least in partial overlap in an arbitrary order;

depth adjustment means for adjusting a depth of each of the stereoscopic images in such a manner that the more forward the corresponding image is placed by the stereoscopic image arrangement means, the larger the depth thereof becomes; and image recording means for recording the stereoscopic images laid out in a state where the depth has been adjusted by the depth adjustment means.

A first image processing method of the present invention comprises the steps of:

inputting a plurality of stereoscopic images;

detecting a depth of each of the stereoscopic images;

laying out the stereoscopic images at least in partial overlap in such a manner that the larger the depth is, the more forward the corresponding image is placed; and recording the stereoscopic images having been laid out.

A second image processing method of the present invention comprises the steps of:

inputting a plurality of stereoscopic images;

laying out the stereoscopic images at least in partial overlap in an arbitrary order;

adjusting a depth of each of the stereoscopic images to cause the depth to become larger as the corresponding stereoscopic image is placed more forward; and recording the stereoscopic images having been laid out in a state where the depth has been adjusted.

According to the first image processing apparatus, the first image display apparatus, the first imaging apparatus, and the first image processing method of the present invention, the stereoscopic images are inputted and the depth is detected in each of the inputted stereoscopic images. The stereoscopic images are then laid out at least in partial overlap in such a manner that the larger the depth is, the more forward the corresponding stereoscopic image is placed. Therefore, when the stereoscopic images are composited at least in partial overlap into one stereoscopic image, the composited stereoscopic image can be recorded or displayed with more emphasis on the stereoscopic appearance thereof.

According to the second image processing apparatus, the second image display apparatus, the second imaging apparatus, and the second image processing method of the present invention, the stereoscopic images are inputted and laid out at least in partial overlap in an arbitrary order. The depth of each of the stereoscopic images is then adjusted in such a manner that the more forward the corresponding stereoscopic image is placed, the larger the depth becomes. Therefore, when the stereoscopic images are composited at least in partial overlap into one stereoscopic image, the composited stereoscopic image can be recorded or displayed with more emphasis on the stereoscopic appearance thereof.

BRIEF DESCRIPTION OF THE DRAWINGS

FIG. 20 is a flow chart showing the flow of imaging processing by the imaging apparatus in FIG. 19.

DESCRIPTION OF THE PREFERRED EMBODIMENTS

Figure 1:
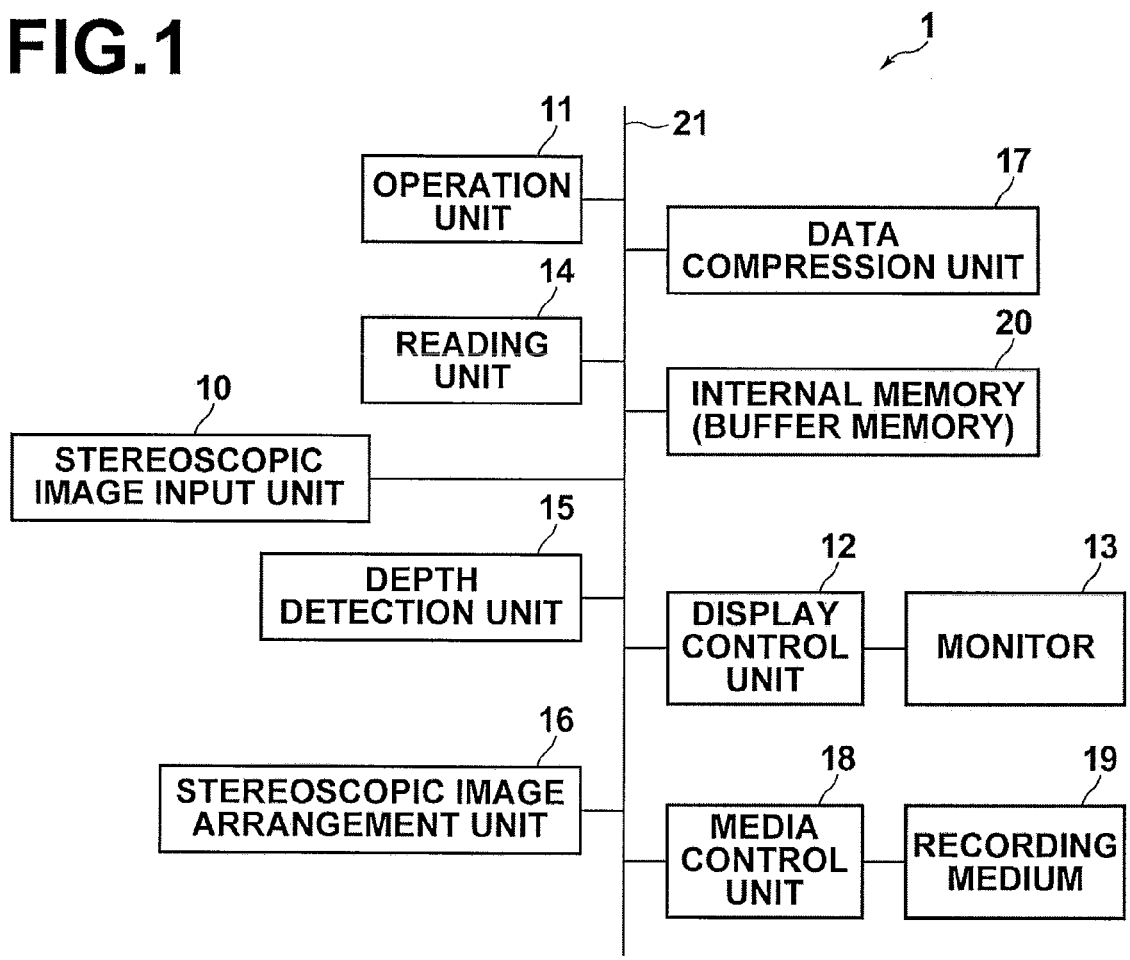
FIG. 1 is a block diagram showing the configuration of an image processing apparatus of a first embodiment of the present invention.
Figure 2:
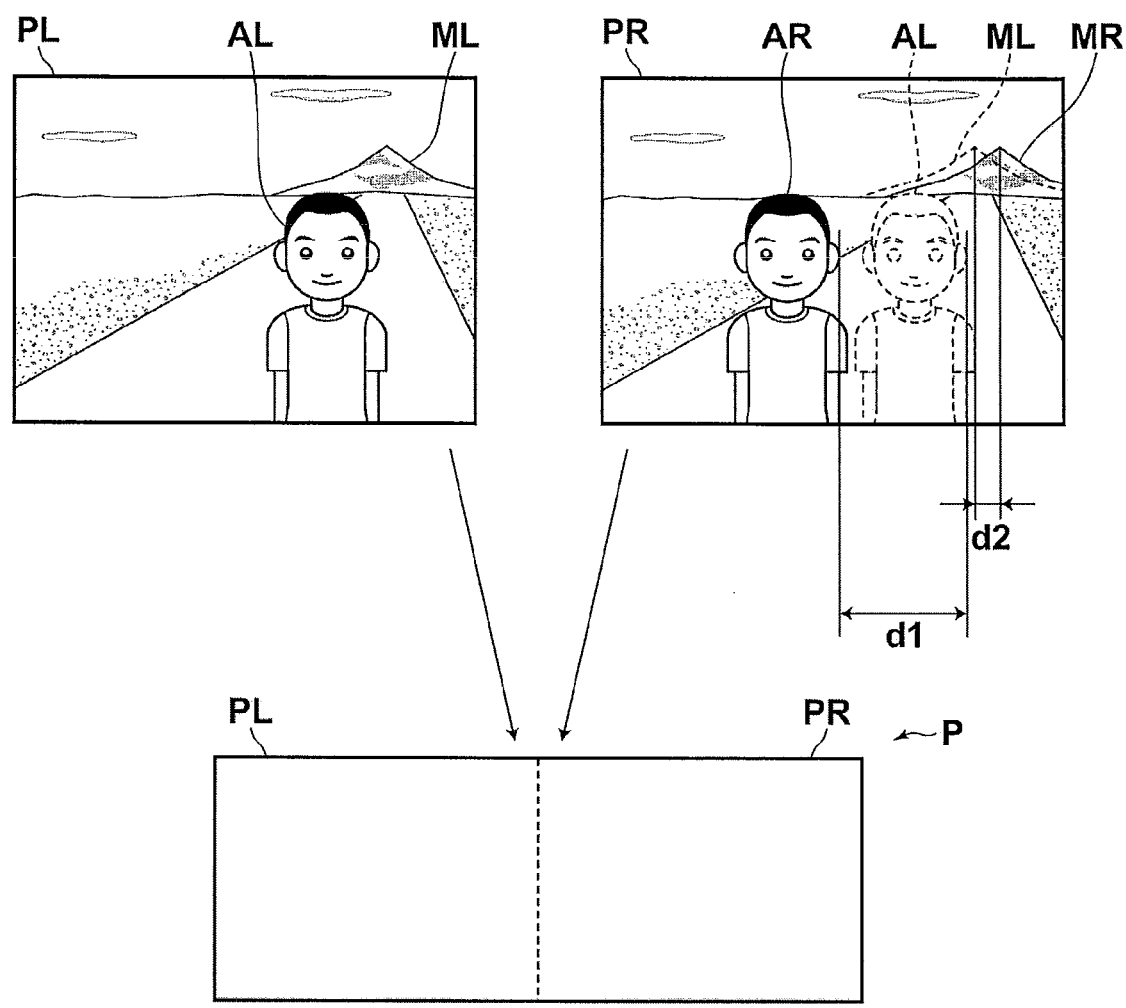
FIG. 2 shows an example of planar images for the right and left eyes and a stereoscopic image.
Figure 3:
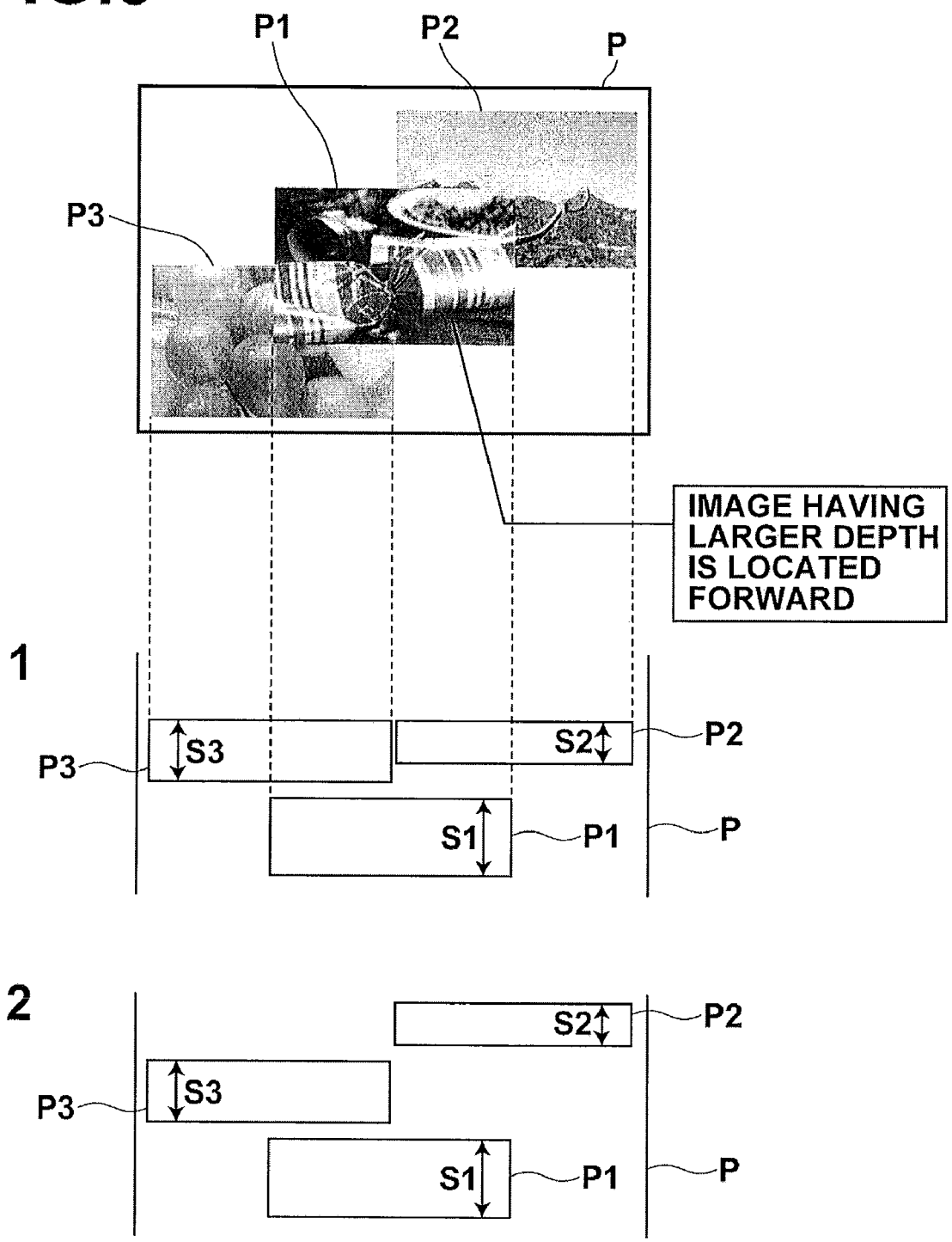
FIG. 3 shows an example of a composited stereoscopic image generated from a plurality of stereoscopic images.

Hereinafter, embodiments of the present invention will be described in detail with reference to the accompanying drawings. FIG. 1 is a block diagram showing the configuration of an image processing apparatus 1 of a first embodiment of the present invention. FIG. 2 shows an example of planar images PR and PL for the right and left eyes and a stereoscopic image P while FIG. 3 shows an example of the stereoscopic image P composited from a plurality of stereoscopic images P1 to P3.

The image processing apparatus 1 in this embodiment is to generate a stereoscopic image by combining a plurality of stereoscopic images. As shown in FIG. 1, the image processing apparatus 1 comprises a stereoscopic image input unit (stereoscopic image input means) 10, an operation unit 11, a display control unit 12, a monitor 13, a reading unit 14, a depth detection unit (depth detection means) 15, a stereoscopic image arrangement unit (stereoscopic image arrangement means) 16, a data compression unit 17, a media control unit 18, a recording medium (recording means) 19, an internal memory 20, and the like, all of which send and receive various kinds of signals and data via a data bus 21.

The stereoscopic image input unit 10 inputs data sets and/or files of a plurality of stereoscopic images P (also collectively referred to as the data sets and the like). The stereoscopic image input unit 10 can input the data sets and/or the files of the stereoscopic images P stored in the recording medium 19 or the internal memory 20 that will be described later, by reading the data sets and/or the files via the media control unit 18. The stereoscopic image input unit 10 can also read and input the data sets and/or the files of the stereoscopic images P via a wired or wireless network.

The data sets of stereoscopic images P refer to data sets each generated by combining data sets of planar images PR and PL for the right and left eyes (hereinafter also referred to as the right-eye image PR and the left-eye image PL) obtained by photography of a subject from two different viewpoints, and realize stereoscopic vision by using a parallax of the subject in the planar images PR and PL arranged side by side (see FIG. 2) or by using a parallax generated by the respective planer images. Each of the files of stereoscopic images P may be one image file generated to include a plurality of planar images and having a header including information representing that the file includes the planar images, information on positions of the planar images, information on a depth (which will be described later) of the corresponding stereoscopic image P, and the like. When each of the image files is opened, the planer images are arranged side by side to generate the stereoscopic image. Alternatively, each of the files may be generated as separate files having filenames relating the images for the right and left eyes.

The operation unit 11 comprises a mouse, a keyboard, and various kinds of buttons, for example. A user can carry out various kinds of setting by operating the operation unit 11.

The display control unit 12 causes the monitor 13 to display a planar image having side by side the planar images PR and PL for the right and left eyes of each of the stereoscopic images P represented by the data sets and the like inputted by the stereoscopic image input unit 10, as well as various kinds of setting menus, and the like. The display control unit 12 also causes the monitor 13 to display the planar images for the right and left eyes of each of the stereoscopic images P represented by the data sets and the like recorded in the recording medium 19 and read by the media control unit 18 that will be described later.

The monitor 13 displays a planar image via the display control unit 12, as well as the various kinds of setting menus that are set by operation of the operation unit 11.

The reading unit 14 reads the data sets of the stereoscopic images P, that is, the data sets including the data sets of the planar images PR and PL for the right and left eyes inputted by the stereoscopic image input unit 10. The reading unit 14 also reads the various kinds of information included in the header of each of the files of the stereoscopic images P.

The depth detection unit 15 is to detect the depth of each of the stereoscopic images P represented by the data sets and the like read by the reading unit 14. For example, the depth can be detected according to the information of depth thereof read by the reading unit 14 from the header in the case where the stereoscopic image input unit 10 has inputted the files of the stereoscopic images P.

In order to realize stereoscopic viewing of a stereoscopic image, a parallax of a subject included in two images is used. Therefore, a depth of a stereoscopic image is dependent on the parallax. For an object located in background such as a mountain in FIG. 2, a parallax d2 is small, since the mountain is located at almost the same position when viewed by the left eye and by the right eye. On the other hand, an object located in foreground, such as a person in FIG. 2, a parallax d1 is large, since the person seems to be located at different positions in the right and left. Consequently, the larger a difference (d1-d2) between a maximum parallax and a minimum parallax in the two images is, the larger the depth becomes. For this reason, the depth may be detected as the difference between the maximum parallax and the minimum parallax at each pair of corresponding pixels detected according to a known stereo matching method in the right-eye image PR and in the left-eye image PL, as shown in FIG. 2.

The stereoscopic image arrangement unit 16 lays out the stereoscopic images P represented by the data sets and the like inputted by the stereoscopic image input unit 10, such as the stereoscopic images P1 to P3 shown in FIG. 3 at least in partial overlap in such a manner that the larger the depth detected by the depth detection unit 15 is, the more forward the corresponding stereoscopic image is placed. In the portion of FIG. 3 denoted by the numeral 1, a depth S1 of the stereoscopic image P1 is larger than depths P2 and P3 of the stereoscopic images P2 and P3. Therefore, the image P1 is located in front of the images P2 and P3. At this time, the stereoscopic image arrangement unit 16 generates the stereoscopic image P by in advance laying out the stereoscopic images P1 to P3 in a layout desired by the user and instructed through operation of the operation unit 11, and by overlapping the images P1 to P3 in the order described above only in a portion where any overlap is observed in the stereoscopic image P. By laying out the stereoscopic image P1 having the larger depth in foreground, the stereoscopic image P having more emphasized stereoscopic appearance can be generated.

As shown in the portion of FIG. 3 denoted by the numeral 2, in the case where the depth S3 of the stereoscopic image P3 is larger than the depth S2 of the stereoscopic image P2, the stereoscopic image P3 may be located in front of the stereoscopic image P2.

The data compression unit 17 compresses a data set of the composited stereoscopic image P, and the compressed data set is recorded in the recording medium 19 via the media control unit 18.

The media control unit 18 reads and writes the data sets and the files of the stereoscopic images P from and in the recording medium 19.

The recording medium (recording means) 19 is a recording medium that can store various kinds of data and files such as the data sets and the files of the stereoscopic images P, and comprises a magnetic or optical recording medium or a semiconductor memory, for example.

The internal memory 20 stores various kinds of constants set in the image processing apparatus 1, programs, and the like. The internal memory 20 also functions as a buffer memory for storing the data sets and the like inputted by the stereoscopic image input means 10 and the data set of the stereoscopic image P composited by the stereoscopic image arrangement unit 16, for example.

Figure 4:
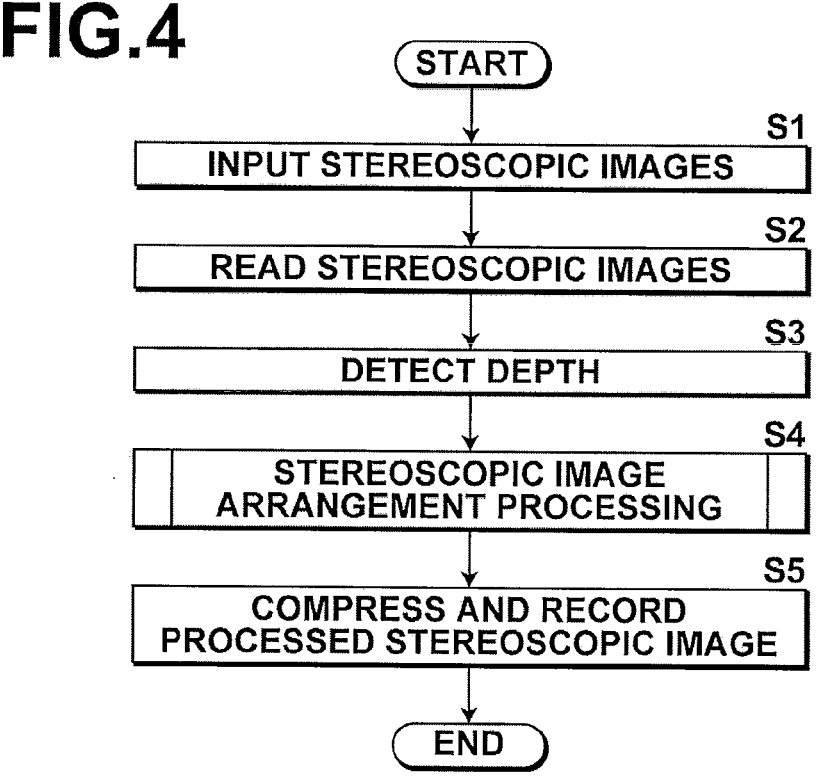
FIG. 4 is a flow chart showing the flow of image processing by the first image processing apparatus in FIG. 1.
Figure 5:
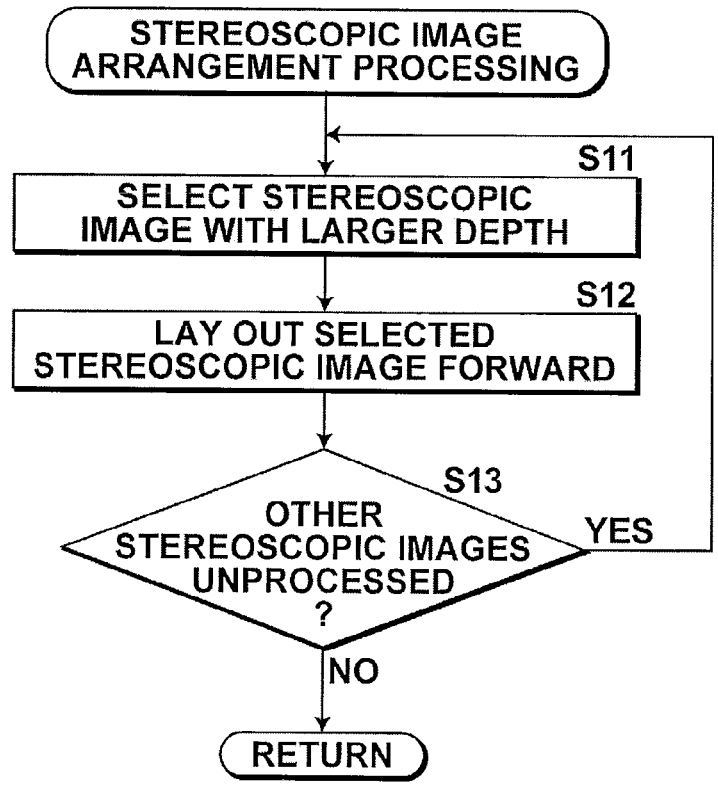
FIG. 5 is a flow chart showing stereoscopic image arrangement processing by a stereoscopic image arrangement unit in FIG. 1.

The configuration of the image processing apparatus 1 in this embodiment has been described above. The image processing carried out by the image processing apparatus 1 will be described below. FIG. 4 is a flow chart showing the flow of the image processing by the image processing apparatus 1, and FIG. 5 is a flow chart showing stereoscopic image arrangement processing carried out by the stereoscopic image arrangement unit 16.

The stereoscopic image input unit 10 in the image processing apparatus 1 firstly inputs the data sets and the like of the stereoscopic images P, such as those of the three stereoscopic images P1 to P3, as shown in FIG. 4 (Step S1). The reading unit 14 reads the data sets of the planar images PR and PL for the right and left eyes of each of the stereoscopic images P1 to P3 (Step S2).

The depth detection unit 15 detects the depth, that is, the difference between the maximum parallax d1 and the minimum parallax d2 found by searching for corresponding points such as edges and shape patterns in the planar images PR and PL for the right and left eyes in each of the stereoscopic images P (Step S3). The depth detected for each of the stereoscopic images P1 to P3 is stored in the internal memory 20.

The stereoscopic image arrangement unit 16 carries out the stereoscopic image arrangement processing (Step S4). In the stereoscopic image arrangement processing, the stereoscopic images P1 to P3 have been laid out in advance in the desired layout instructed by the user with use of the operation unit 11 as shown in FIG. 3, and the stereoscopic images P1 to P3 in the composited stereoscopic image P are laid out in partial overlap in the order determined according to the processing described below. At this time, the right-eye images PR and the left-eye images PL of the stereoscopic images P1 to P3 are respectively laid out in a right-eye image PR and in a left-eye image PL of the composited stereoscopic image P in the same order.

As shown in FIG. 5, the stereoscopic image arrangement unit 16 selects the stereoscopic image whose depth is the largest (the stereoscopic image P1 in FIG. 3) among the depths S1 to S3 of the stereoscopic images P1 to P3 stored in the internal memory 20 (Step S11), and arranges the selected stereoscopic image P1 in foreground (Step S12). A judgment is then made as to whether another one of the stereoscopic images exists, that is, as to whether all the stereoscopic images have been processed (Step S13). In the case where any one of the stereoscopic images has been unprocessed (Step S13; YES), the flow of processing returns to Step S11. The processing from Step S11 is repeated until all the stereoscopic images have been processed. In the case where none of the stereoscopic images has been left unprocessed (Step S13; NO), the stereoscopic image arrangement processing ends.

As shown in FIG. 4, after the stereoscopic image arrangement unit 16 has ended the stereoscopic image arrangement processing (Step S4), the data set of the processed stereoscopic image P, that is, the data set of the composited stereoscopic image P is compressed, and the media control unit 18 records the compressed stereoscopic image data set in the recording medium 19 (Step S5) to end the image processing by the image processing apparatus 1.

According to the image processing apparatus 1 of this embodiment and the image processing method described above, when the stereoscopic images P1, P2, P3, and so on are laid out to generate the composited stereoscopic image P, the larger the depth of the corresponding stereoscopic image is, the more forward the image is placed. In this manner, the composited stereoscopic image can be generated with the emphasized stereoscopic appearance.

In the image processing apparatus 1 in the embodiment described above, the depth detection unit 15 detects the depth of all the stereoscopic images represented by the data sets and the like inputted by the stereoscopic image input unit 10. However, the present invention is not necessarily limited thereto, and the depth may be detected for a part of the stereoscopic images laid out in partial overlap in the composited stereoscopic image.

Figure 6:
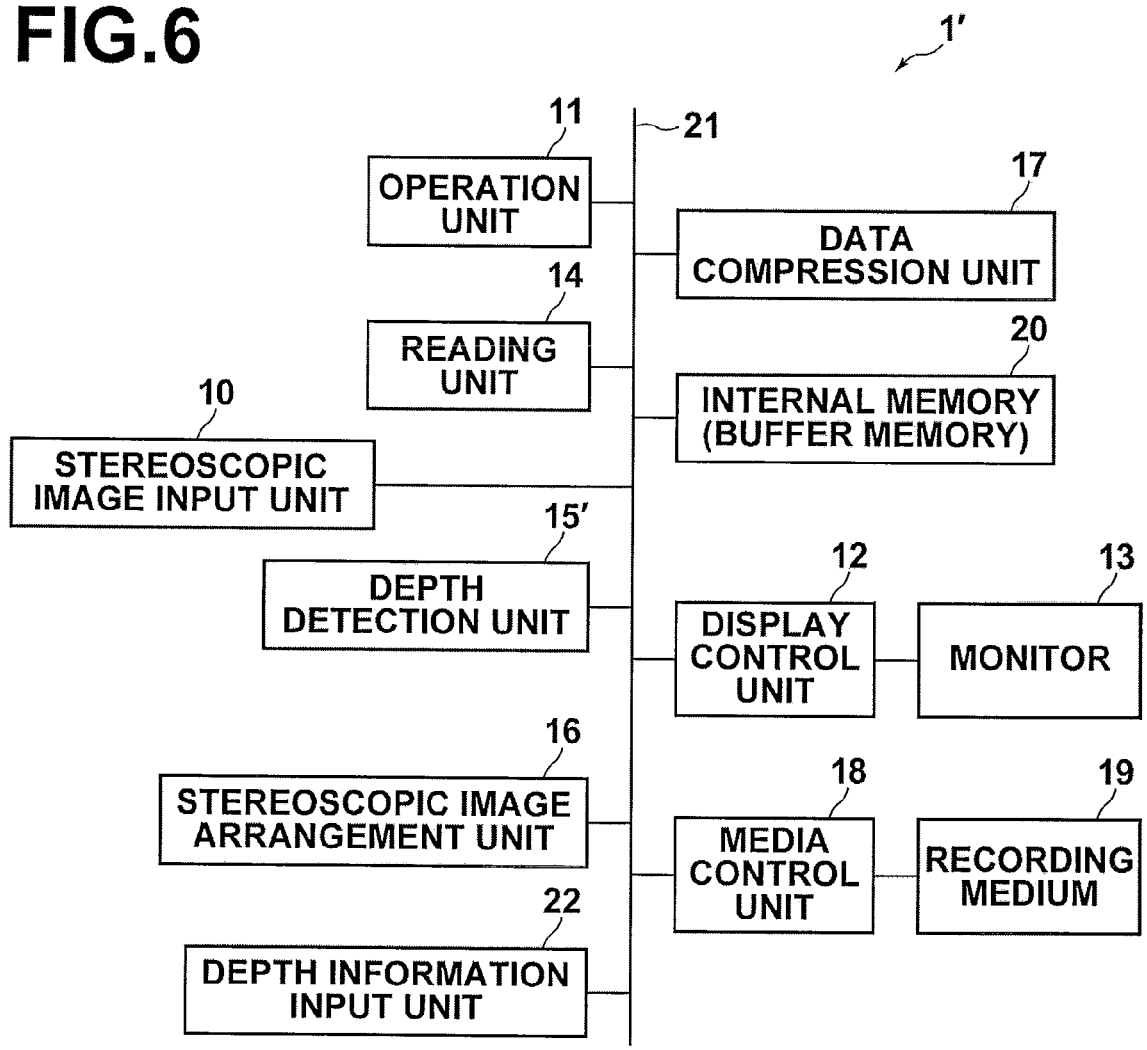
FIG. 6 is a block diagram showing the configuration of another image processing apparatus of the first embodiment.
Figure 7:
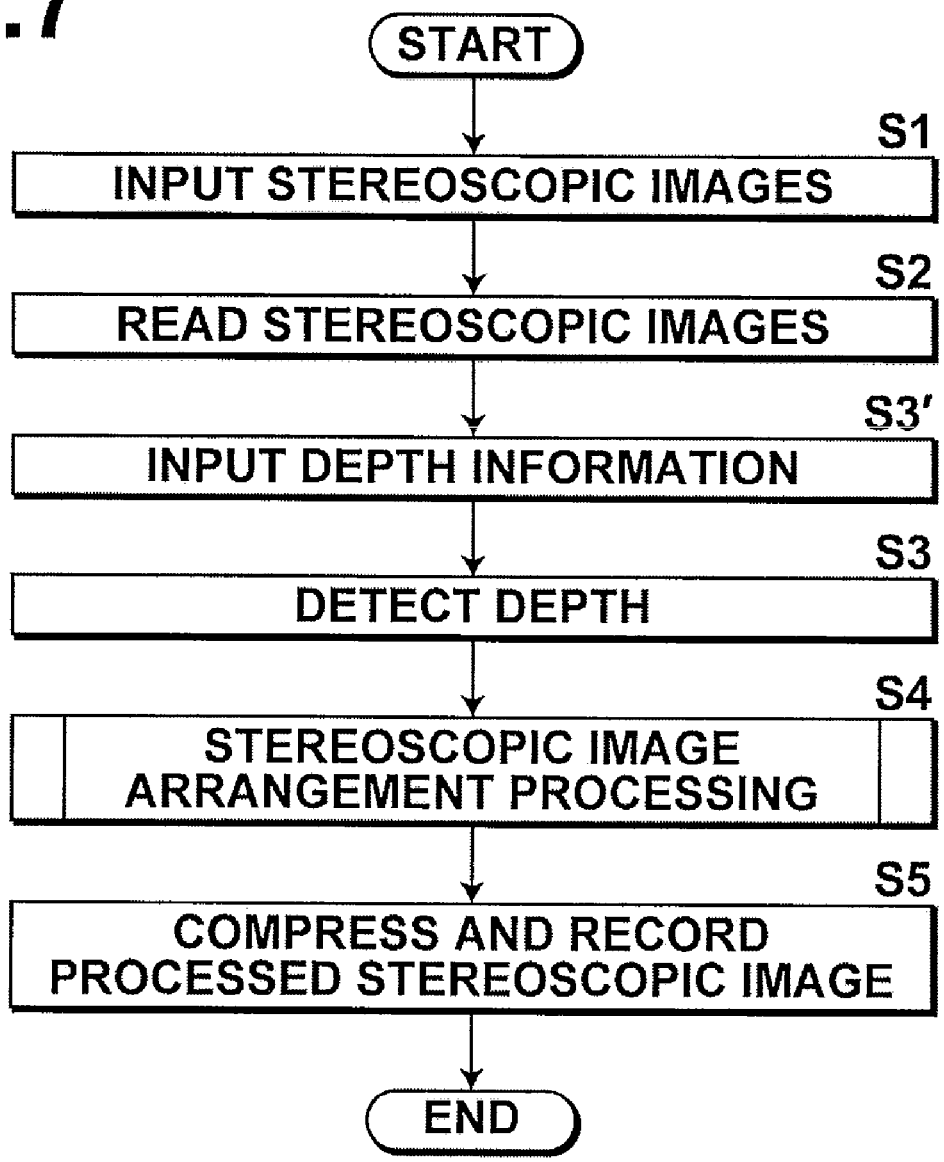
FIG. 7 is a flow chart showing the flow of image processing by the image processing apparatus in FIG. 6.

In addition, the depth detection unit 15 of the image processing apparatus 1 detects the depth of each of the stereoscopic images represented by the data sets and the like inputted by the stereoscopic image input unit 10. However, the present invention is not necessarily limited thereto. Another image processing apparatus 1' will therefore be described next. FIG. 6 is a block diagram showing the configuration of the image processing apparatus 1', and FIG. 7 is a flow chart showing the flow of image processing by the image processing apparatus 1'. In FIG. 7, the same processing as in the flow chart in FIG. 4 has the same step numbers, and detailed description thereof will be omitted.

The image processing apparatus 1' further has a depth information input unit 22, as shown in FIG. 6. The depth information input unit 22 reads and inputs depth information that is necessary for finding the depth and added to a file separated from each of the files of the stereoscopic images P1, P2, and so on. The depth information refers to a focal position and a zooming position at the time of photography, a distance between principal points of two cameras for photography of a subject from different viewpoints and an angle of convergence between the cameras, and the like. Alternatively, the depth information input unit 22 reads and inputs depth information added to a file that is separated from each of the files of the stereoscopic images P1, P2, and so on and related thereto. A depth detection unit 15' in the image processing apparatus 1' detects the depth based on the depth information inputted by the depth information input unit 22.

In the image processing in FIG. 7 carried out by the image processing apparatus 1' having the above configuration, the data sets and the like of the stereoscopic images inputted by the stereoscopic image input unit 10 are read (Step S2). The depth information input unit 22 then reads and inputs the depth information added to the file separated from the files of the stereoscopic images recorded in the recording medium 19 via the media control unit 18 (Step S3'). The depth detection unit 15' detects the depth according to the depth information inputted by the depth information input unit 22 (Step S3). In this manner, the image processing is carried out by the image processing apparatus 1'.

Figure 8:
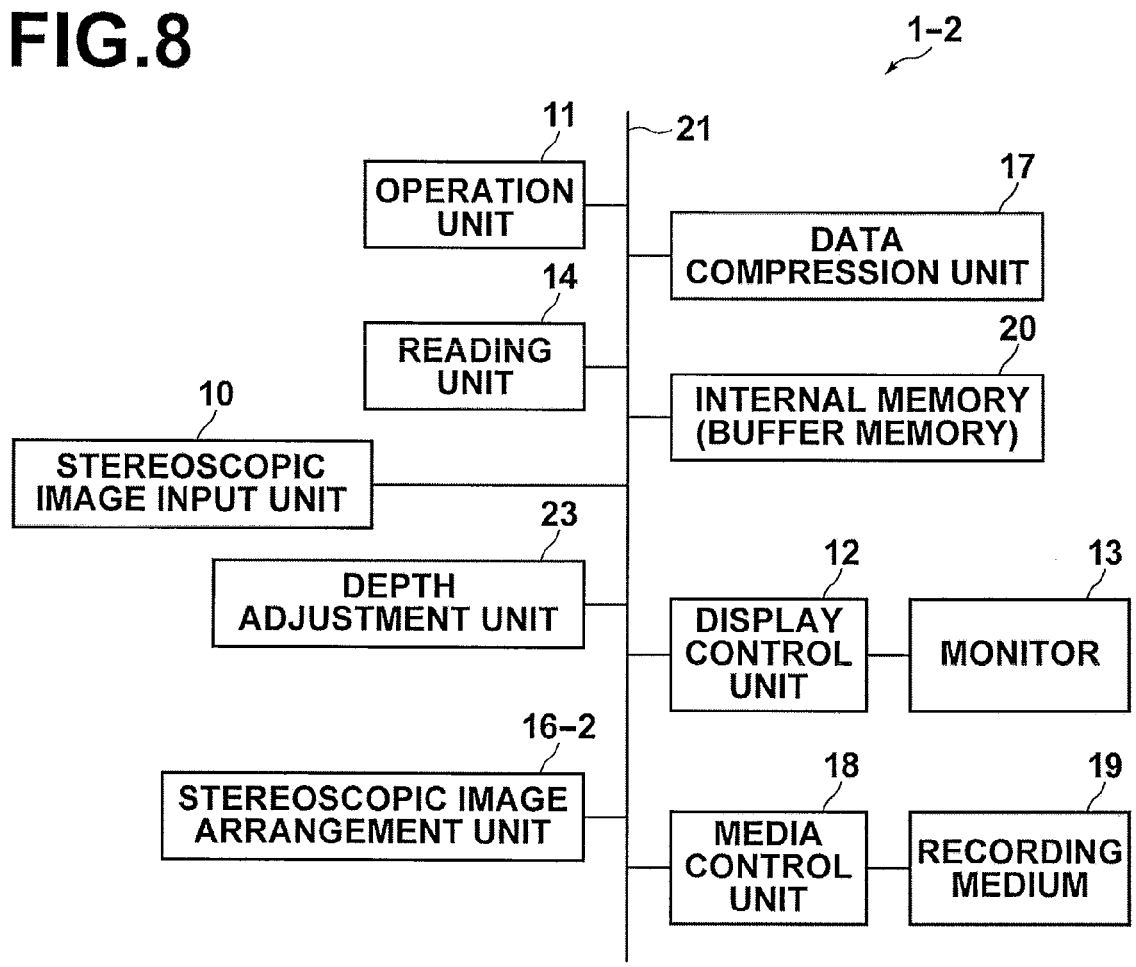
FIG. 8 is a block diagram showing the configuration of an image processing apparatus of a second embodiment of the present invention.
Figure 9:
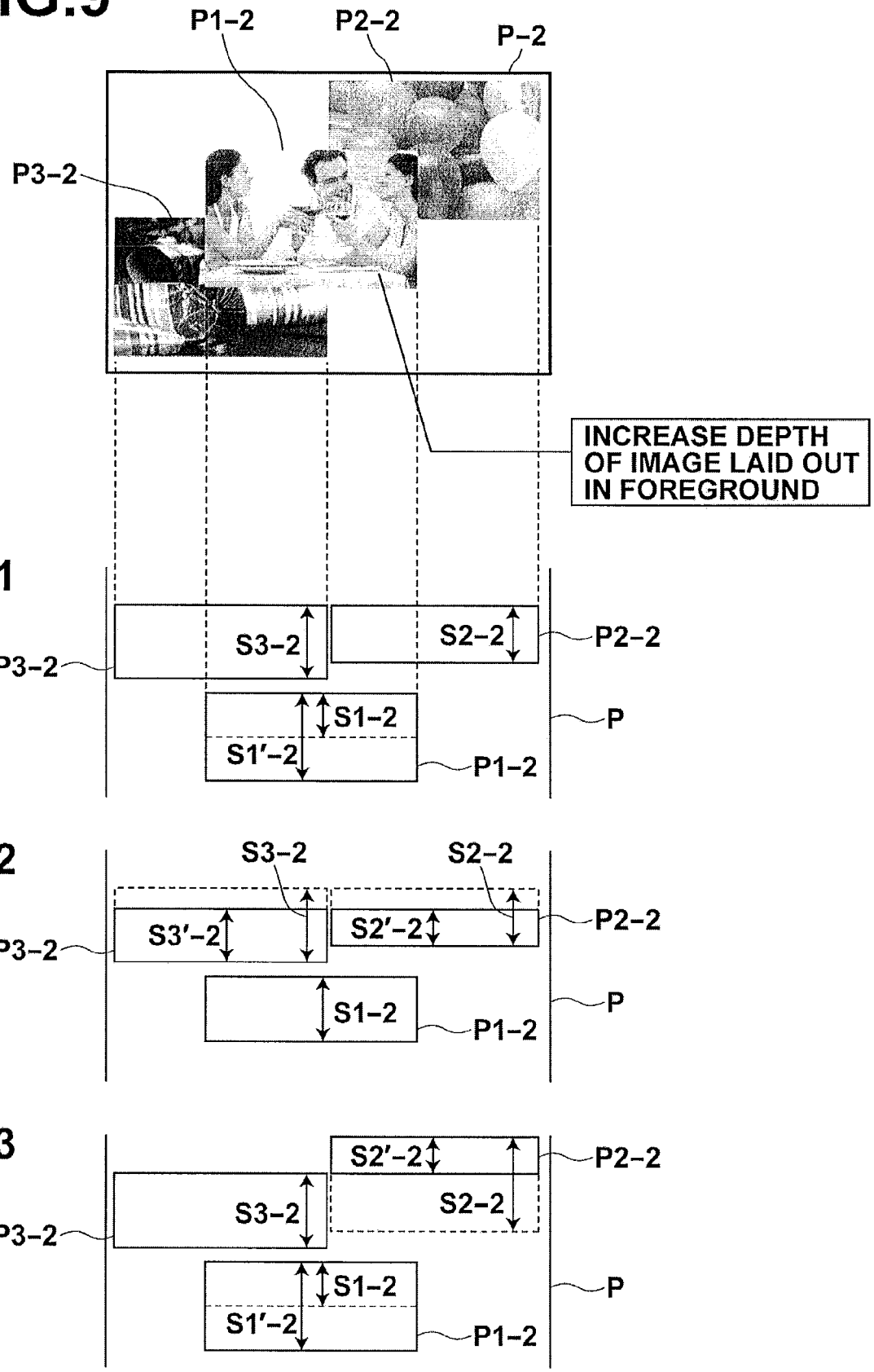
FIG. 9 shows another example of a composited stereoscopic image generated from a plurality of stereoscopic images.
Figure 10:
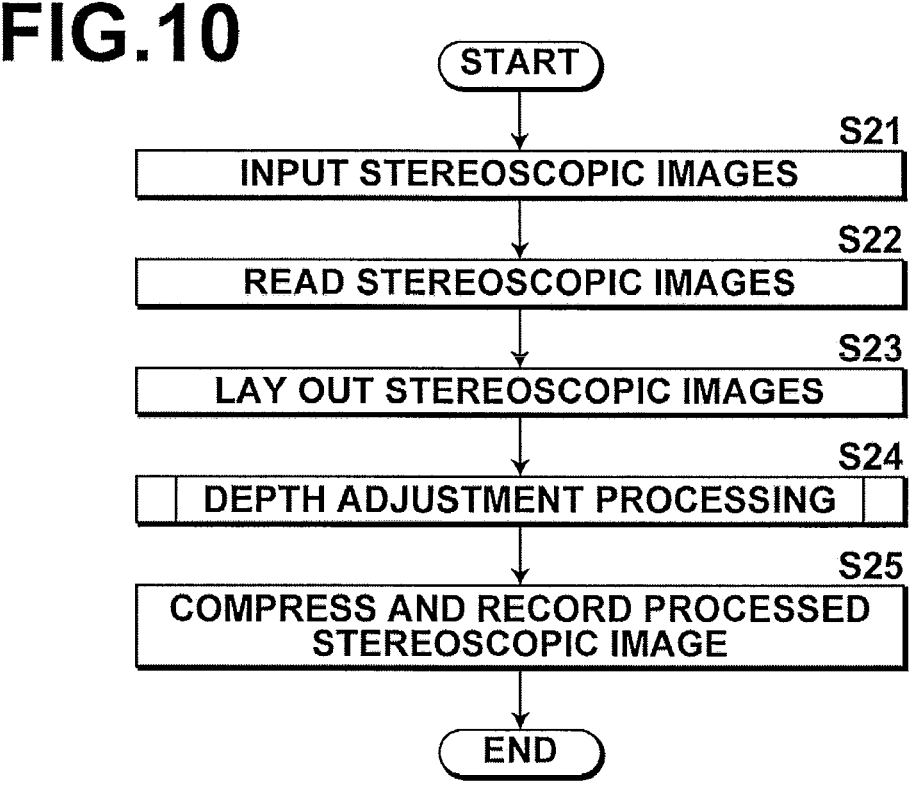
FIG. 10 is a flow chart showing the flow of image processing by the image processing apparatus in FIG. 8.
Figure 11:
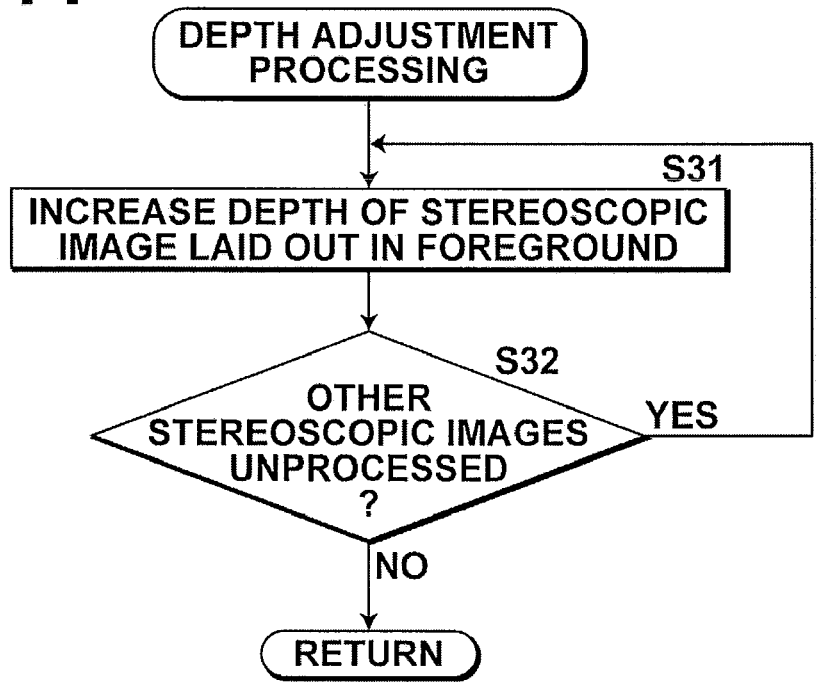
FIG. 11 is a flow chart showing depth adjustment processing by a depth adjustment unit in FIG. 8.
Figure 12:
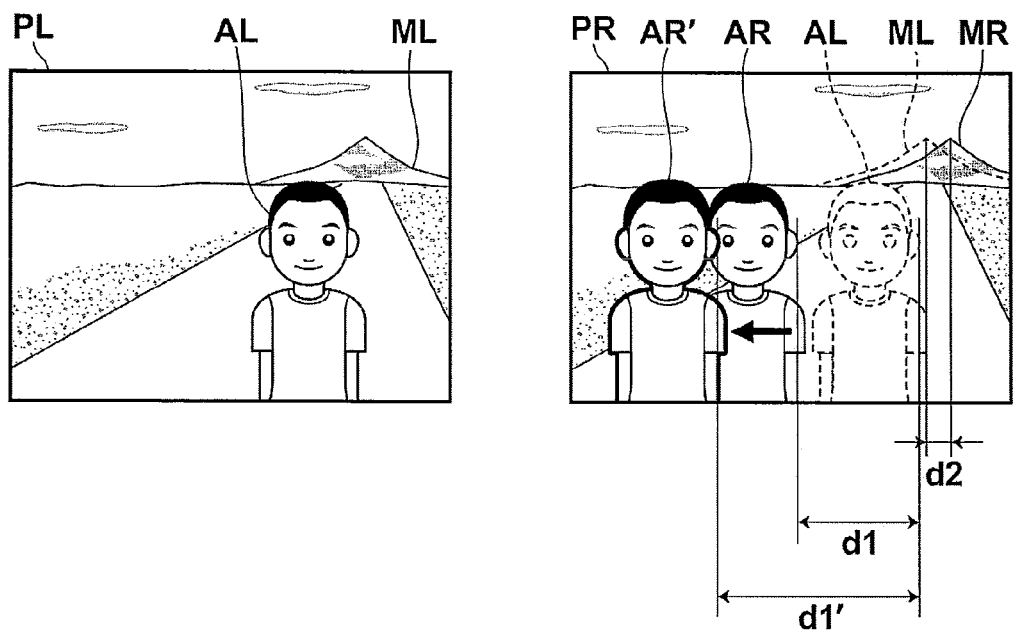
FIG. 12 shows an example of planar images for the right and left eyes.

An image processing apparatus 1-2 of a second embodiment of the present invention will be described next in detail with reference to the accompanying drawings. FIG. 8 is a block diagram showing the configuration of the image processing apparatus 1-2 in the second embodiment, and FIG. 9 shows another example of a stereoscopic image generated by compositing a plurality of stereoscopic images. FIG. 10 is a flow chart showing the flow of image processing carried out by the image processing apparatus 1-2 shown in FIG. 8, and FIG. 11 is a flow chart showing depth adjustment processing by a depth adjustment unit 23. FIG. 12 shows an example of planar images PR and PL for the right and left eyes. In FIG. 8, the same units as in the block diagram shown in FIG. 1 have the same reference codes, and detailed description thereof will be omitted.

As shown in FIG. 8, the image processing apparatus 1-2 in this embodiment has the depth adjustment unit 23, and does not have the depth detection unit 15 or 15' in the image processing apparatus 1 or 1'. A stereoscopic image arrangement unit 16-2 in this embodiment generates one stereoscopic image P-2 as shown in FIG. 9 by compositing a plurality of stereoscopic images such as three stereoscopic images P1-2, P2-2, and P3-2 represented by data sets and the like inputted by a stereoscopic image input unit 10, in a layout desired by a user and instructed with use of the operation unit 11.

In the case where the stereoscopic images P1-2, P2-2, and P3-2 are laid out in partial overlap in the generated stereoscopic image P-2, the depth adjustment unit 23 adjusts a depth of each of the stereoscopic images in such a manner that the more forward the corresponding image is placed, the larger the depth thereof becomes. For example, the depth adjustment unit 23 adjusts a depth S1-2 of the stereoscopic image P1-2 located in front of the stereoscopic images P2-2 and P3-2 to become a depth S1'-2 that is larger than depths S2-2 and S3-2 of the stereoscopic images P2-2 and P3-2, as shown in the portion of FIG. 9 denoted by the numeral 1. Alternatively, the depth adjustment unit 23 adjusts the depths S2-2 and S3-2 of the stereoscopic images P2-2 and P3-2 located behind the stereoscopic image P1-2 to become depths S2'-2 and S3'-2 that are smaller than the depth S1-2 of the stereoscopic image P1-2, as shown in the portion of FIG. 9 denoted by the numeral 2.

At this time, in the case where the stereoscopic image P2-2 is placed behind the stereoscopic image P3-2 and the depth S2-2 thereof is larger than the depth S3-2 of the stereoscopic image P3-2 as shown in the portion of FIG. 9 denoted by the numeral 3, the depth adjustment unit 23 may adjust the depth S2-2 of the stereoscopic image P2-2 to become the depth S2'-2 that is smaller than the depth S3-2.

In the image processing shown in FIG. 10 carried out by the image processing apparatus 1-2 having the above configuration, the stereoscopic image input unit 10 inputs the data sets and the like of the stereoscopic images such as the images P1-2 to P3-2 (Step S21). A reading unit 14 reads data sets of right-eye images PR and left-eye images PL of the respective stereoscopic images P1-2 to P3-2 (Step S22).

The stereoscopic image arrangement unit 16-2 generates the stereoscopic image P-2 by in advance laying out the stereoscopic images P1-2 to P3-2 in a layout desired by a user and instructed with use of an operation unit 11, as shown in FIG. 9 (Step S23). At this time, the right-eye images PR and the left-eye images PL of the respective stereoscopic images P1-2 to P3-2 are laid out in the same order in a right-eye image PR and a left-eye image PL of the generated stereoscopic image P-2.

The depth adjustment unit 23 then carries out the depth adjustment processing for the stereoscopic images P1-2 to P3-2 at least in partial overlap (Step S24).

As shown in FIG. 11, in the depth adjustment processing, the depth S1-2 of the stereoscopic image P1-2 located in foreground is adjusted first to become larger than the depths S2-2 and S3-2 of the other stereoscopic images P2-2 and P3-2 (Step S31). For the depth adjustment, corresponding points such as edges and shape patterns are detected in the right-eye image PR and in the left-eye image PL of the stereoscopic image P1-2, and a maximum parallax d1 and a minimum parallax d2 are detected between the right-eye image PR and the left-eye image PL as shown in FIG. 12. The depth is adjusted so as to cause a difference between the maximum parallax d1 and the minimum parallax d2 to become larger. For example, the depth is adjusted by increasing the maximum parallax d1.

The maximum parallax d1 is a parallax between a person AR in the right-eye image PR and a person AL in the left-eye image PL. Therefore, as shown in the right of FIG. 12, a region including the person AR is extracted in the right-eye image PR and moved to a direction that causes the parallax d1 to become a larger parallax d1', that is, to the left of FIG. 12. For a region remaining after extraction of the region including the person AR in the right-eye image PR, interpolation processing is carried out thereon by using the left-eye image PL, as has been described in Japanese Unexamined Patent Publication No. 2004-207772, for example.

In this embodiment, the processing described above is carried out on the right-eye image PR. However, as long as the maximum parallax d1 becomes larger, the processing may be carried out on the left-eye image PL or on both the images PR and PL. Alternatively, the minimum parallax d2 may be decreased. In addition, the maximum parallax d1 may be increased while the minimum parallax d2 may be decreased.

A judgment is then made as to whether any one of the stereoscopic images remains unprocessed, that is, whether the depth adjustment has been carried out on all the stereoscopic images at least in partial overlap (Step S32). In the case where any one of the stereoscopic images remains unprocessed (Step S32; YES), the flow or processing returns to Step S31, and the processing from Step S31 is repeated until the depth adjustment has been carried out on all the stereoscopic images. In the case where none of the stereoscopic images is left unprocessed (Step S32; NO), the depth adjustment processing is ended.

After the depth adjustment unit 23 has ended the depth adjustment processing as shown in FIG. 10 (Step S24), a data set for the processed (that is, composited) stereoscopic image P-2 is compressed, and a media control unit 18 records the compressed data set of the stereoscopic image P-2 in a recording medium 19 (Step S25). In this manner, the image processing by the image processing apparatus 1-2 ends.

According to the image processing apparatus 1-2 of this embodiment and the image processing method described above, in the case where the stereoscopic images P1-2, P2-2, P3-2, and so on are partially overlapped and composited into the stereoscopic image P-2, the depth of the stereoscopic image laid out in foreground is increased. Consequently, the composited image with the emphasized stereoscopic appearance can be generated.

Figure 13:
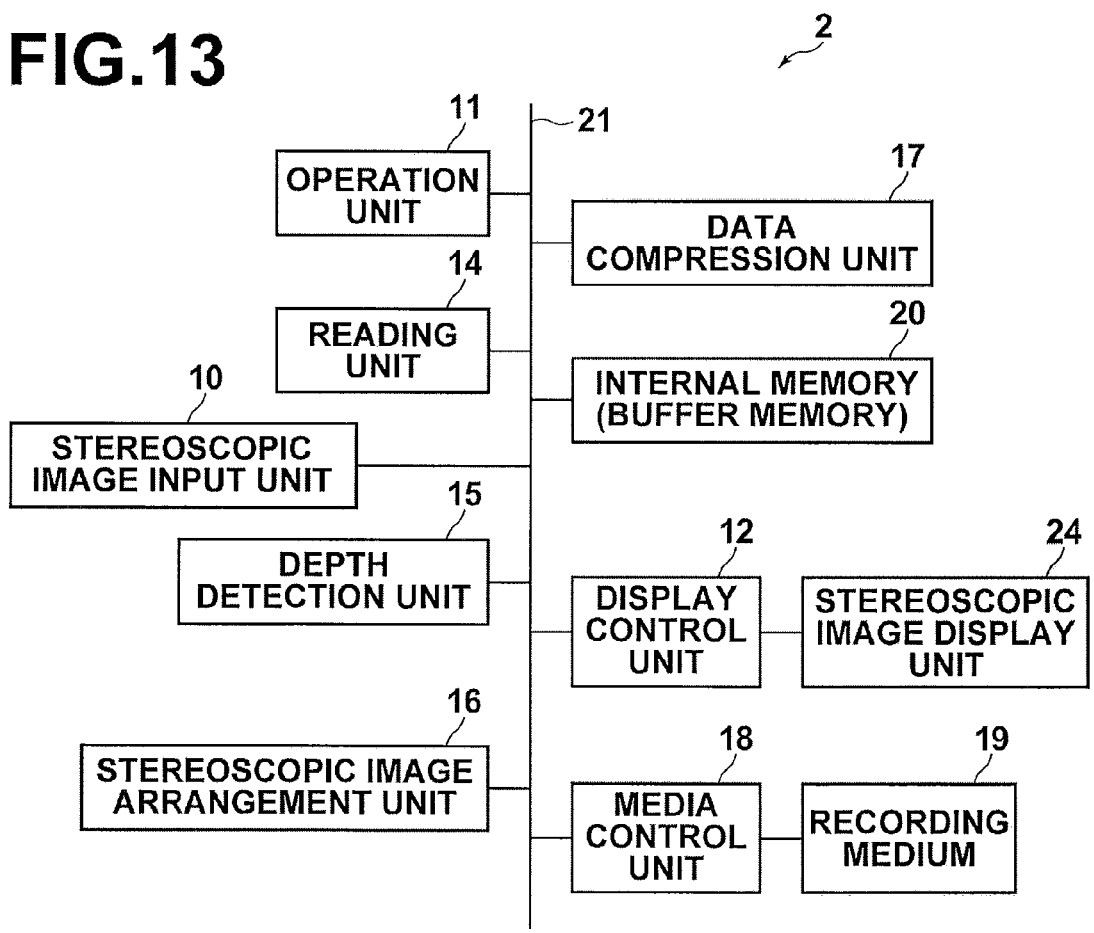
FIG. 13 is a block diagram showing the configuration of an image display apparatus of a third embodiment of the present invention.

An image display apparatus 2 in a third embodiment of the present invention will be described next in detail, with reference to the accompanying drawings. FIG. 13 is a block diagram showing the configuration of the image display apparatus 2 in the third embodiment. In FIG. 13, the same units as in the block diagram in FIG. 1 have the same reference codes, and detailed description thereof will be omitted. As shown in FIG. 13, the image display apparatus 2 in this embodiment has a stereoscopic image display unit 24 that enables stereoscopic viewing of a stereoscopic image P comprising planar images for the right and left eyes having a parallax, instead of the monitor 13 that displays only planar images.

The stereoscopic image display unit 24 may adopt a parallax barrier method or a lenticular method. In a parallax barrier method, a planar left-eye image PL and a planar right-eye image PR are cut vertically into strips displayed alternately. A viewer views the images through slits cut vertically in the same manner, and the planar images for the right and left eyes are respectively seen by the right and left eyes of the viewer. In a lenticular method, a lenticular lens is used instead of the slits.

The stereoscopic image display unit 24 may adopt any method as long as the method enables stereoscopic viewing of the stereoscopic image P. The stereoscopic image display unit 24 may adopt a so-called scanning backlight method in which a light path changes in time series as has been described in Japanese Patent No. 3930021, for example. Alternatively, the stereoscopic image display unit 24 may use a time division method wherein a left-eye image and a right-eye image are displayed alternately and an image is stereoscopically viewed with use of glasses to view the images separately.

Figure 14:
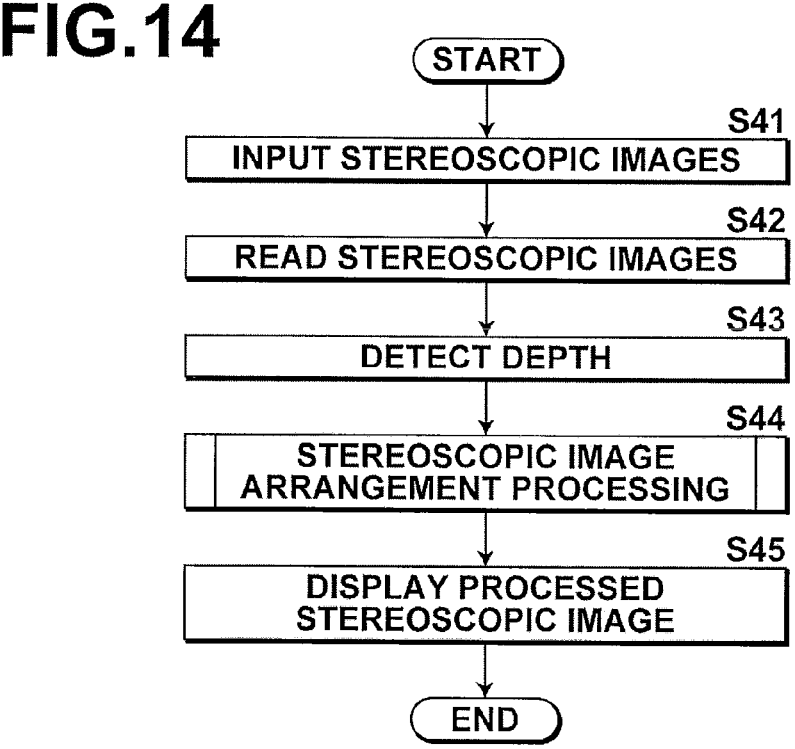
FIG. 14 is a flow chart showing the flow of image display processing by the image display apparatus in FIG. 13.

A method of image display by the image display apparatus 2 in the above configuration will be described below. FIG. 14 is a flow chart showing the flow of image display processing by the image display apparatus 2 shown in FIG. 13. In FIG. 14, Steps S41 to S44 are the same as Steps S1 to S4 in FIG. 4. Therefore, the description thereof will be omitted.

After arrangement processing in FIG. 14 ends on the stereoscopic image P in the image display apparatus 2 (Step S44), the stereoscopic image P having stereoscopic images laid out therein is displayed on the stereoscopic image display unit 24 (Step S45) to end the image display processing.

As has been described above, according to the image display apparatus 2 and the image display method in this embodiment, in the case where a plurality of stereoscopic images are laid out in partial overlap and composited into one stereoscopic image, a stereoscopic image having a larger depth is placed more forward. Therefore, the composited stereoscopic image having more emphasized stereoscopic appearance can be displayed.

Figure 15:
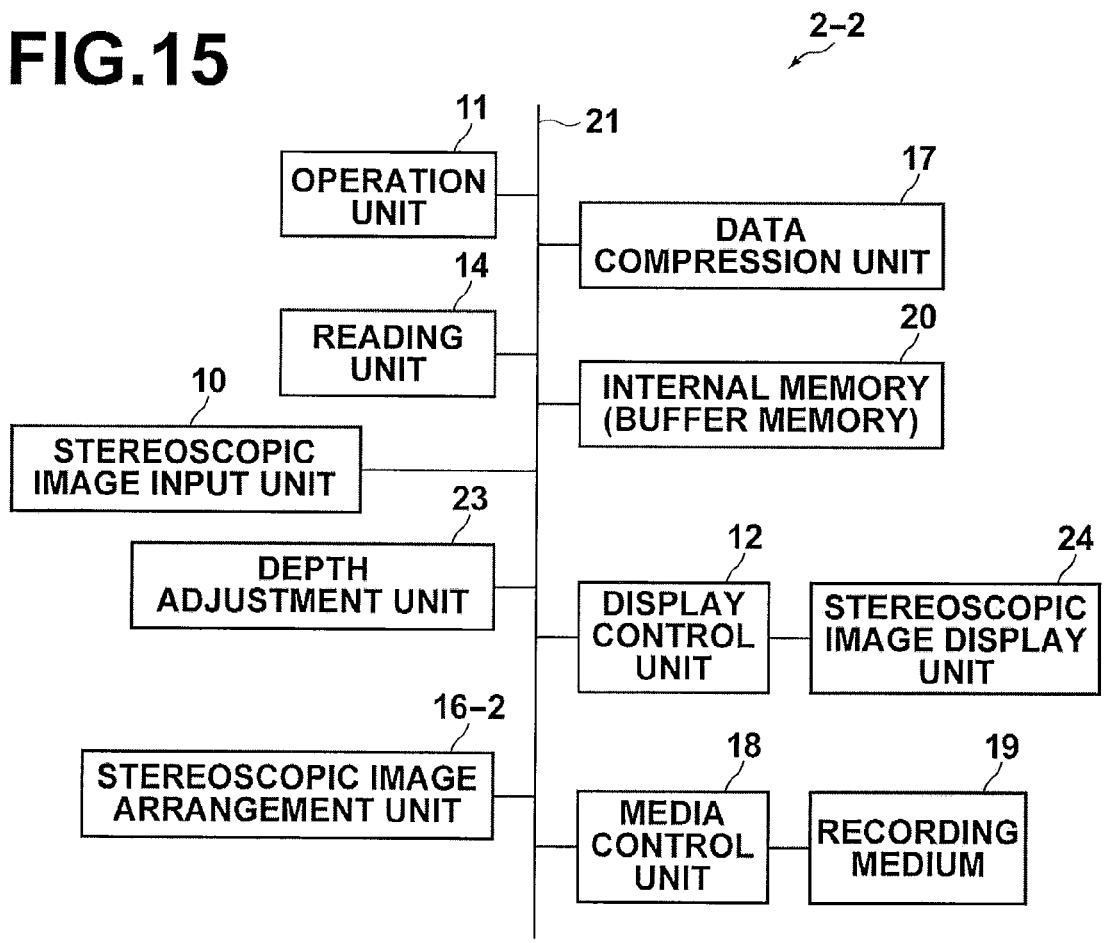
FIG. 15 is a block diagram showing the configuration of an image display apparatus of a fourth embodiment of the present invention.

An image display apparatus 2-2 in a fourth embodiment of the present invention will be described next in detail, with reference to the accompanying drawings. FIG. 15 is a block diagram showing the configuration of the image display apparatus 2-2 in the fourth embodiment. In FIG. 15, the same units as in the block diagram in FIG. 8 have the same reference codes, and the description thereof will be omitted. As shown in FIG. 15, the image display apparatus 2-2 has a stereoscopic image display unit 24 that enables stereoscopic viewing of a stereoscopic image P comprising planar images for the right and left eyes having a parallax, instead of the monitor 13 that displays only planar images. The stereoscopic image display unit 24 is the same as the stereoscopic image display unit 24 in the image display apparatus 2, and the description thereof will not be repeated.

Figure 16:
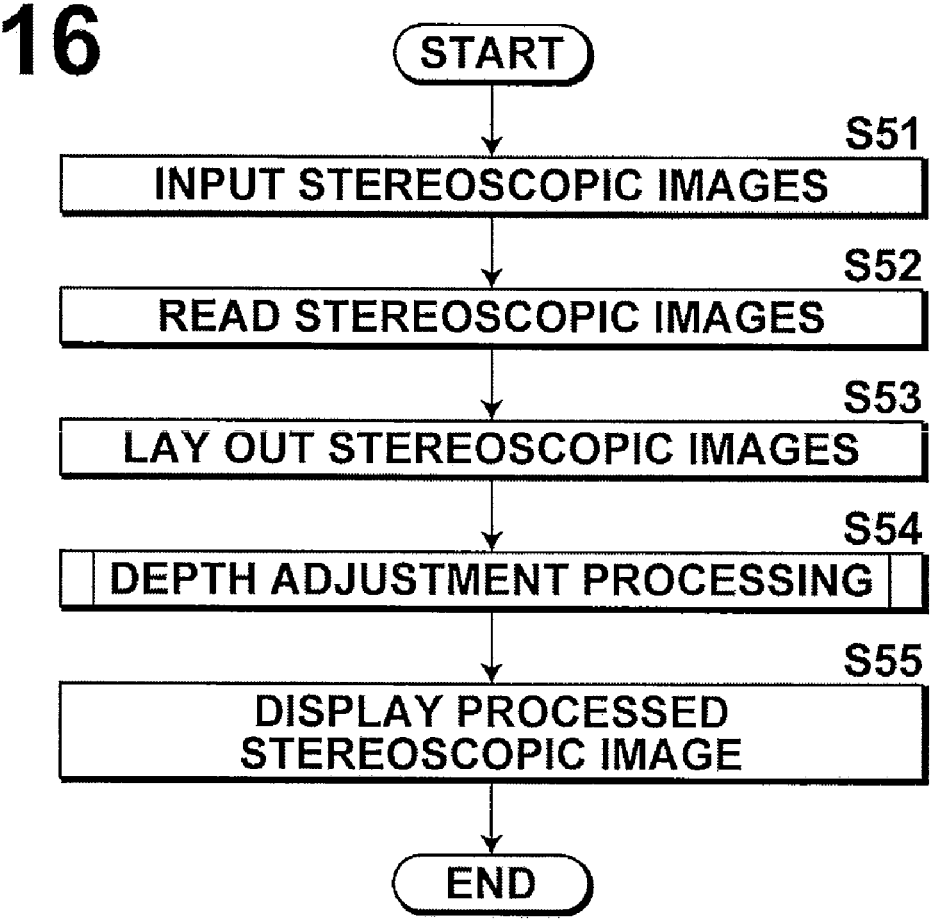
FIG. 16 is a flow chart showing the flow of image display processing by the image display apparatus in FIG. 15.

A method of image display by the image display apparatus 2-2 having the above configuration will be described below. FIG. 16 is a flow chart showing the flow of image display processing by the image display apparatus 2-2 shown in FIG. 15. In FIG. 16, Steps S51 to S54 are the same as Steps S21 to S24 in FIG. 10, and the description thereof will therefore be omitted.

After depth adjustment processing shown in FIG. 16 has ended in the image display apparatus 2-2 (Step S54), a stereoscopic image P having stereoscopic images laid out therein is displayed on the stereoscopic image display unit 24 (Step S55) to end the image display processing.

As has been described above, according to the image display apparatus 2-2 and the image display method in this embodiment, in the case where a plurality of stereoscopic images are laid out in partial overlap and composited into one stereoscopic image to be displayed, a depth of a stereoscopic image placed in foreground is increased. Therefore, the composited stereoscopic image having more emphasized stereoscopic appearance can be displayed.

Figure 17:
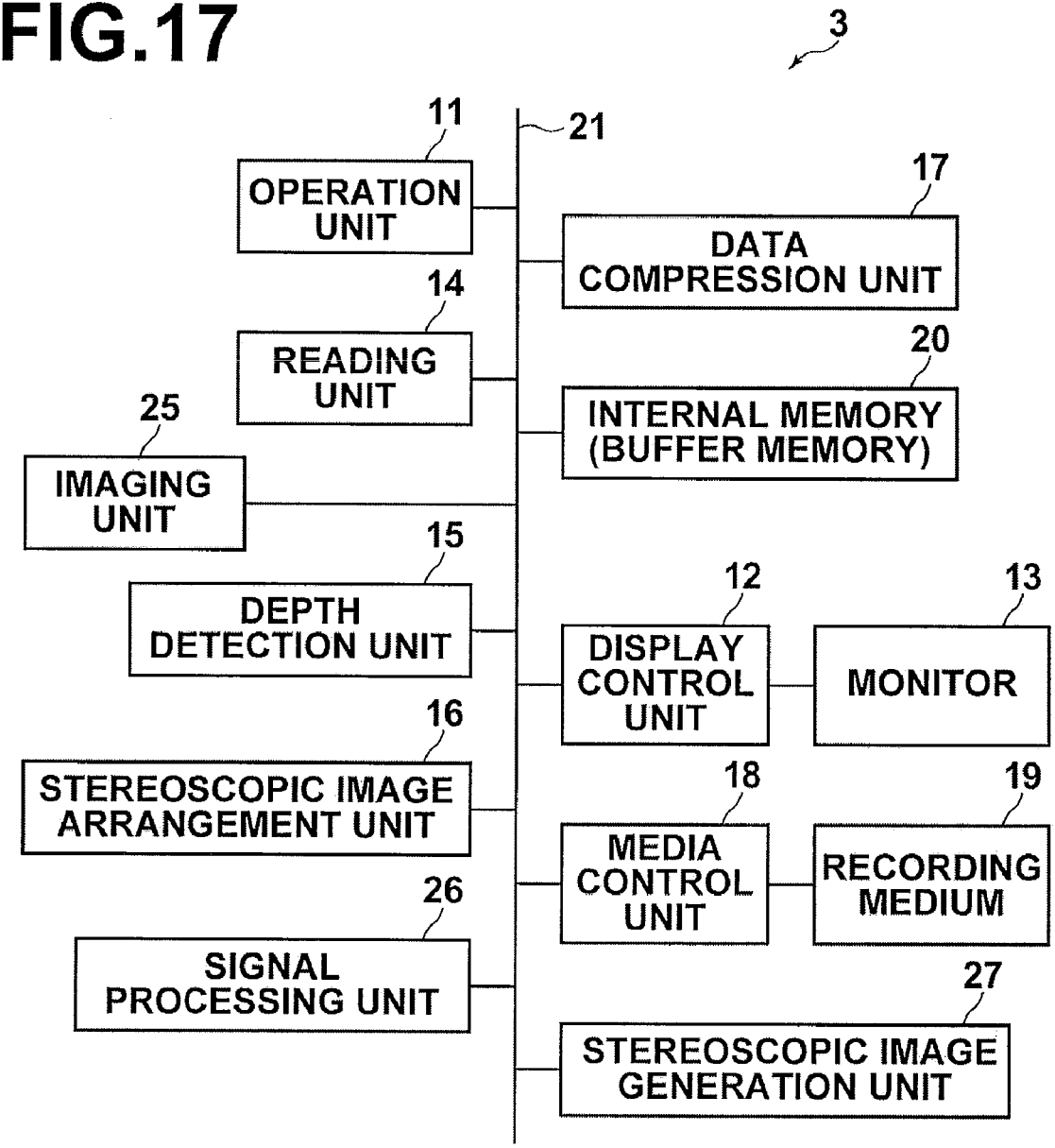
FIG. 17 is a block diagram showing the configuration of an imaging apparatus of a fifth embodiment of the present invention.

An imaging apparatus 3 in a fifth embodiment of the present invention will be described next in detail with reference to the accompanying drawings. FIG. 17 is a block diagram showing the configuration of the imaging apparatus 3 in the fifth embodiment. In FIG. 17, the same units as in the block diagram in FIG. 1 have the same reference codes, and the description thereof will be omitted. The imaging apparatus 3 has an imaging unit 25, a signal processing unit 26, and a stereoscopic image generation unit 27, and does not have the stereoscopic image input unit 10 shown in FIG. 1.

The imaging unit 25 enables photography of the same subject from different viewpoints. The imaging unit 25 may comprise one camera that sequentially photographs a subject while changing a viewpoint. Alternatively, the imaging unit 25 may comprise a plurality of cameras at different viewpoints to photograph a subject at the same time.

The signal processing unit 26 carries out signal processing such as A/D conversion on a plurality of image signals obtained by the imaging unit 25.

The stereoscopic image generation unit 27 generates a data set of a stereoscopic image P as has been described above, from a pair of planar images such as a right-eye image PR and a left-eye image PL that have been obtained by the imaging unit 25 through photography from the different viewpoints and have been subjected to the signal processing by the signal processing unit 26. The stereoscopic image generation unit 27 may generate a file of the stereoscopic image P comprising a plurality of image data sets and various kinds of information including depth information, by detecting a maximum parallax and a minimum parallax in the right-eye image PR and the left-eye image PL through stereo matching processing and by detecting a depth, that is, a difference between the maximum and minimum parallaxes.

Figure 18:
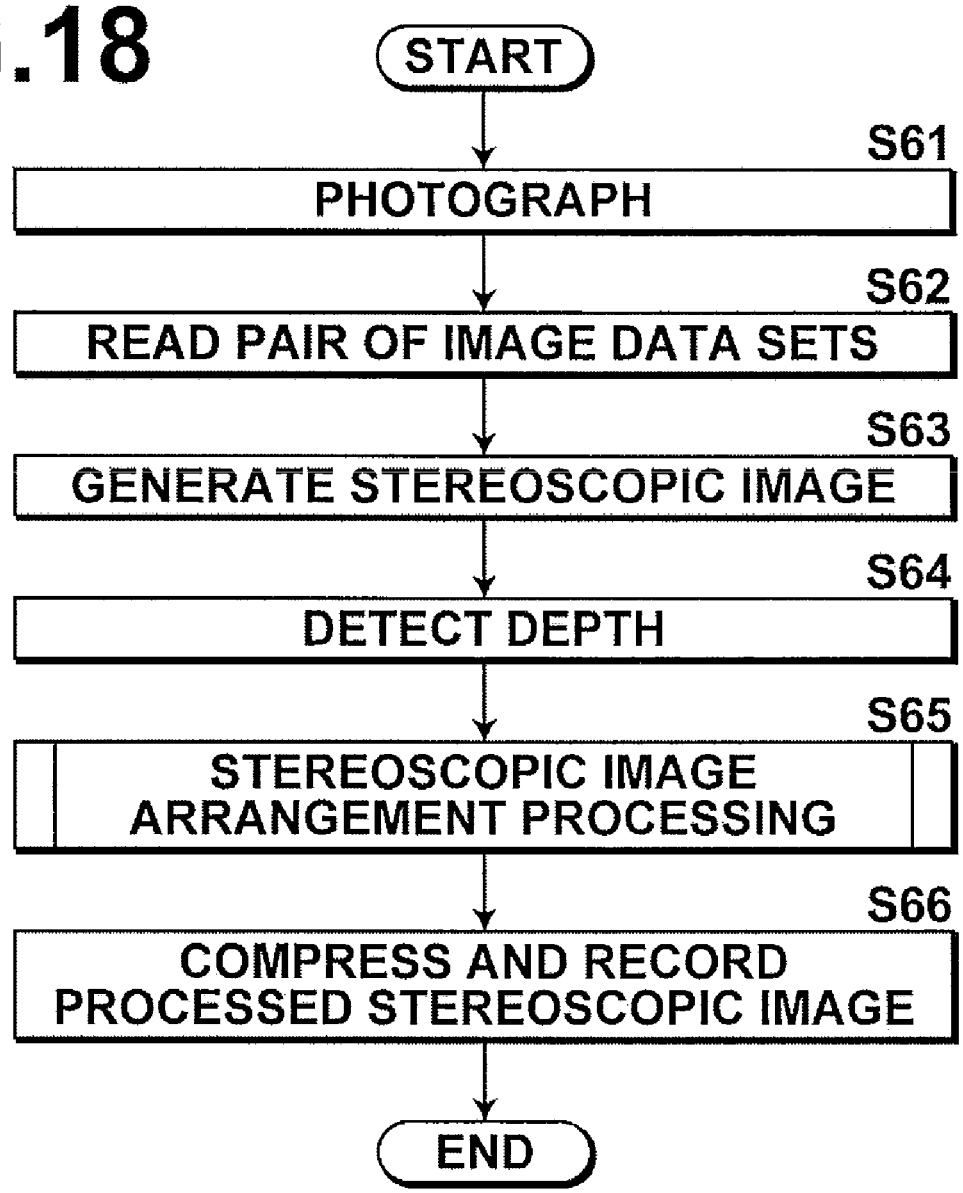
FIG. 18 is a flow chart showing the flow of imaging processing by the imaging apparatus in FIG. 17.

The flow of imaging processing by the imaging unit 3 having the above configuration will be described next. FIG. 18 is a flow chart showing the flow of imaging processing. In FIG. 18, Steps S64 to S66 are the same as Steps S3 to S5 in FIG. 5, and the description thereof will be omitted here.

As shown in FIG. 18, the imaging unit 25 in the imaging apparatus 3 obtains a pair of planar image data sets, that is, the data sets of the right-eye image PR and the left-eye image PL by photography of a subject as has been described above (Step S61). The signal processing unit 26 then reads the pair of planar image data sets, and carries out the signal processing thereon (Step S62). The stereoscopic image generation unit 27 generates the data set or the file of the stereoscopic image P from the data sets of the right-eye image PR and the left-eye image PL having been subjected to the signal processing (Step S63).

A depth detection unit 15 detects a depth of the generated stereoscopic image P (Step S64). By repeating the processing from Step S61 to Step S64 several times, the stereoscopic images P of different subjects and the depth of each of the stereoscopic images P are obtained.

Alternatively, the stereoscopic images P may be obtained first by repeating the processing from Step S61 to Step S63 several times. In this case, the depth of each of the stereoscopic images P is detected thereafter.

After a stereoscopic image arrangement unit 16 has ended stereoscopic image arrangement processing shown in FIG. 18 (Step S65), a data set of the processed (composited) stereoscopic image P is compressed and a media control unit 18 records the data set in a recording medium 19 (Step S66). In this manner, the imaging processing by the imaging apparatus 3 ends.

As has been described above, according to the imaging apparatus 3 in this embodiment and the imaging method described above, each of the stereoscopic images is obtained by photography of a subject from different viewpoints. In the case where the obtained stereoscopic images are laid out in partial overlap to generate the composited stereoscopic image, the composited stereoscopic image can be generated to have the emphasized stereoscopic appearance by laying out the stereoscopic image having a larger depth at a more forward position.

Figure 19:
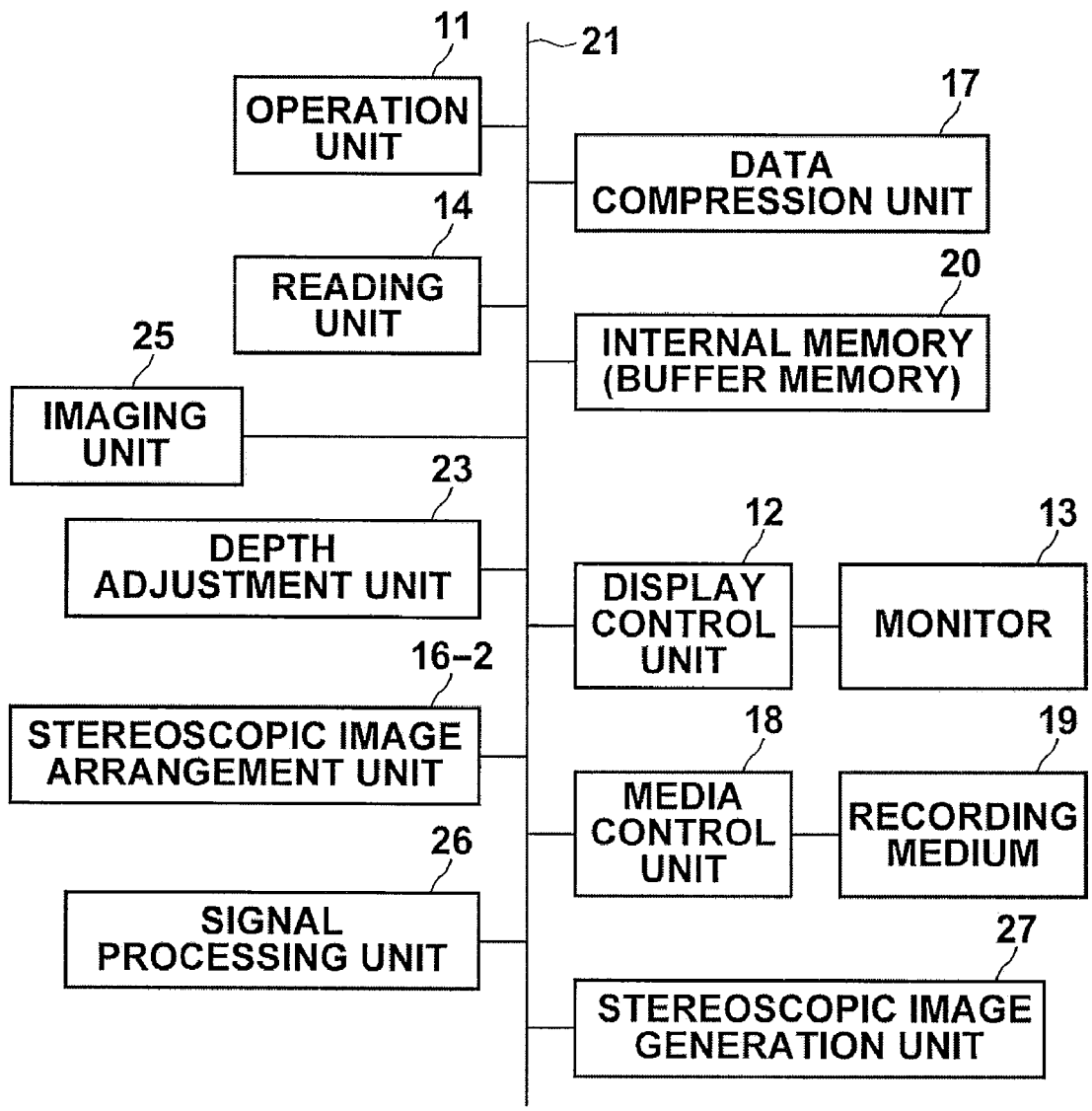
FIG. 19 is a block diagram showing the configuration of an imaging apparatus of a sixth embodiment of the present invention.

An imaging apparatus 3-2 of a sixth embodiment of the present invention will be described below in detail with reference to the accompanying drawings. FIG. 19 is a block diagram showing the configuration of the imaging apparatus 3-2 in the sixth embodiment. In FIG. 19, the same units as in the block diagram in FIG. 8 have the same reference codes, and the description thereof will therefore be omitted. The imaging apparatus 3-2 has an imaging unit 25, a signal processing unit 26, and a stereoscopic image generation unit 27, and does not have the stereoscopic image input unit 10 shown in FIG. 8. The imaging unit 25, the signal processing unit 26, and the stereoscopic image generation unit 27 are the same as in the fifth embodiment, and the description thereof will be omitted.

The flow of imaging processing by the imaging apparatus 3-2 having the above configuration will be described below. FIG. 20 is a flow chart showing the flow of imaging processing by the imaging apparatus 3-2. In FIG. 20, Steps S71 to S73 are substantially the same as Steps S61 to S63 in FIG. 18. In addition, Steps S74 to S76 are the same as Steps S23 to S25 in FIG. 10, and detailed description thereof will also be omitted.

As shown in FIG. 20, the imaging unit 25 in the imaging apparatus 3-2 in this embodiment obtains data sets of a right-eye image PR and a left-eye image PL as has been described above (Step S71), and the signal processing unit 26 carries out signal processing thereon (Step S72). The stereoscopic image generation unit 27 generates a data set or a file of the stereoscopic image P as has been described above, from the data sets of the right-eye image PR and the left-eye image PL having been subjected to the signal processing (Step S73). By repeating the processing from Step S71 to Step S73 several times, stereoscopic images P are obtained.

A stereoscopic image arrangement unit 16-2 lays out in advance the obtained stereoscopic images P (such as the stereoscopic images P1-2 to P3-2 in FIG. 9) in a layout desired by a user, and generates a stereoscopic image P-2 as shown in FIG. 9, for example (Step S74). A depth adjustment unit 23 then adjusts a depth as has been described above (Step S75).

After the depth adjustment unit 23 has ended the depth adjustment processing shown in FIG. 20 (Step S75), a data set of the processed (composited) stereoscopic image P-2 is compressed and a media control unit 18 records the data set in a recording medium 19 (Step S76). In this manner, the imaging processing by the imaging apparatus 3-2 ends.

As has been described above, according to the imaging apparatus 3-2 in this embodiment and the imaging method described above, each of the stereoscopic images is obtained by photography of a subject from different viewpoints. In the case where the obtained stereoscopic images P1-2, P2-2, P3-2 and so on are laid out in partial overlap to generate the composited stereoscopic image, the composited stereoscopic image can be generated to have more emphasized stereoscopic appearance by increasing the depth of the stereoscopic image placed in foreground.

The image processing apparatuses, the image display apparatuses, the imaging apparatuses, and the image processing methods of the present invention are not necessarily limited to the embodiments described above, and can be modified within the scope of the present invention.

What is claimed is:

1. An image processing apparatus comprising:
stereoscopic image input means for inputting a plurality of stereoscopic images, each stereoscopic image being generated by combining planar images for the right and left eyes;
depth detection means for detecting a depth of each of the stereoscopic images inputted by the stereoscopic image input means, the depth being expressed as a difference between a maximum parallax and a minimum parallax in the planar images for the right and left eyes;
stereoscopic image arrangement means for generating a first combined image by combining the planar images for the left eye of the plurality of stereoscopic images on a planar image in which the planar images for the left eye are laid out at least in partial overlap in such a manner that the larger depth detected by the depth detection means is, the more forward the planar image for left eye of the corresponding stereoscopic image is placed, and in the overlapped portions, a portion corresponding thereto of the image laid out more forward is displayed, and for generating a second combined image by combining the planar images for the right eye on a planar image in which the planar images for the right eye are laid out at least in partial overlap in such a manner that the larger depth detected by the depth detection means is, the more forward the planar image for right eye of the corresponding stereoscopic image is placed, and in the overlapped portions, a portion corresponding thereto of the image laid out more forward is displayed; and
image recording means for recording a combined stereoscopic image constituted by the first combined image and the second combined image generated by the stereoscopic image arrangement means.

2. An image processing method comprising the steps of:
inputting a plurality of stereoscopic images, each stereoscopic image being generated by combining planar images for the right and left eyes;
detecting a depth of each of the stereoscopic images, the depth being expressed as a difference between a maximum parallax and a minimum parallax in the planar images for the right and left eyes;
generating a first combined image by combining the planar images for the left eye of the plurality of stereoscopic images on a planar image in which the planar images for the left eye are laid out at least in partial overlap in such a manner that the larger depth detected by the depth detection means is, the more forward the planar image for left eye of the corresponding stereoscopic image is placed, and in the overlapped portions, a portion corresponding thereto of the image laid out more forward is displayed, and generating a second combined image by combining the planar images for the right eye on a planar image in which the planar images for the right eye are laid out at least in partial overlap in such a manner that the larger depth detected by the depth detection means is, the more forward the planar image for right eye of the corresponding stereoscopic image is placed, and in the overlapped portions, a portion corresponding thereto of the image laid out more forward is displayed; and
recording a combined stereoscopic image constituted by the first combined image and the second combined image.

* * * * *